United States Patent
Tomala et al.

(10) Patent No.: US 9,591,501 B2
(45) Date of Patent: Mar. 7, 2017

(54) MEASUREMENT CONFIGURATION AND REPORTING WITH DIVERSE TRAFFIC

(71) Applicant: Nokia Siemens Networks Oy, Espoo (FI)

(72) Inventors: Malgorzata Tomala, Nowe Miasto nad Pilica (PL); Ilkka Keskitalo, Oulu (FI); Sean Kelley, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 724 days.

(21) Appl. No.: 13/630,670

(22) Filed: Sep. 28, 2012

(65) Prior Publication Data

US 2014/0095675 A1 Apr. 3, 2014

(51) Int. Cl.
| | |
|---|---|
| G06F 15/16 | (2006.01) |
| H04W 24/10 | (2009.01) |
| H04L 29/06 | (2006.01) |
| H04L 29/08 | (2006.01) |

(52) U.S. Cl.
CPC ............ H04W 24/10 (2013.01); H04L 29/06 (2013.01); H04L 29/08072 (2013.01)

(58) Field of Classification Search
CPC ......................... H04L 29/06; H04L 29/08072
USPC .................. 709/220, 225, 228; 370/252, 311
See application file for complete search history.

(56) References Cited

U.S. PATENT DOCUMENTS

| | | | | |
|---|---|---|---|---|
| 8,731,543 | B2 * | 5/2014 | Jung et al. | 455/423 |
| 8,923,178 | B2 * | 12/2014 | Anderson et al. | 370/311 |
| 2011/0183662 | A1 | 7/2011 | Lee et al. | 455/422.1 |
| 2011/0201279 | A1 | 8/2011 | Suzuki et al. | 455/67.11 |

(Continued)

FOREIGN PATENT DOCUMENTS

| | | |
|---|---|---|
| EP | 2448314 A2 | 5/2012 |
| WO | WO-2012/047025 A2 | 4/2012 |

OTHER PUBLICATIONS

3GPP TSG SA WG5 (Telecom Management) Meeting #84; S5-121875; Aug. 20-24, 2012; Berlin, Germany; NEC; *Mechanisms for reduction of redundant MDT data*; Document for Discussion and Approval; Agenda Item 6.5.1 (Rel-11) Enhanced Management of UE based network performance measurements (2 pages).

(Continued)

*Primary Examiner* — Khanh Dinh
(74) *Attorney, Agent, or Firm* — Harrington & Smith

(57) ABSTRACT

A network node receiving a preference for a power optimized configuration for a user equipment (UE) can in response change the UE's minimization of drive test (MDT) configuration to conserve UE power. For example, this change can be from immediate reporting of MDT measurements to connected mode logging MDT measurements or no reporting of MDT measurements; or to a longer interval for reporting them, or to drop the reporting of available location information with MDT measurements. Other teachings have actions by the UE, autonomous of the network, to conserve power. A UE receiving a MDT configuration having an MDT measurement reporting or logging interval, and also one or both of a discontinuous reception or paging configuration having a DRX/paging interval can adapt the MDT configuration autonomously of the network to conserve its battery power. For example, the UE can change the MDT measurement reporting/logging interval to be equal to or shorter than the DRX/paging interval, or it can ignore or reject the MDT configuration.

27 Claims, 4 Drawing Sheets

(56) References Cited

U.S. PATENT DOCUMENTS

| | | | |
|---|---|---|---|
| 2011/0250893 A1 | 10/2011 | Lee et al. | 455/437 |
| 2011/0276838 A1 | 11/2011 | Zhou et al. | 714/45 |
| 2012/0044822 A1 | 2/2012 | Kim et al. | 370/252 |
| 2012/0082051 A1 | 4/2012 | Kim et al. | 370/252 |
| 2012/0083263 A1 | 4/2012 | Kim et al. | 455/423 |
| 2012/0088457 A1 | 4/2012 | Johansson et al. | 455/67.11 |
| 2012/0275364 A1* | 11/2012 | Anderson et al. | 370/311 |
| 2012/0275366 A1* | 11/2012 | Anderson et al. | 370/311 |
| 2013/0077508 A1* | 3/2013 | Axmon et al. | 370/252 |
| 2013/0121204 A1* | 5/2013 | Lee et al. | 370/252 |
| 2014/0198680 A1* | 7/2014 | Siomina | H04L 5/14 370/252 |
| 2015/0131749 A1* | 5/2015 | Slomina | H04J 11/005 375/260 |

OTHER PUBLICATIONS

3GPP TSG-RAN2#79; R2-123707; Aug. 13-17, 2012; Qingdao, China; NTT Docomo, Inc., CMCC, TeliaSonera, Deutsche Telekom; *Location Information in event Ax, Bx measurement report for Immediate MDT*; Document for Discussion and Approval; Agenda Item 5.2.4 (3 pages).

3GPP TSG-SA5 Meeting #84 ; S5-121876; Berlin, Germany, Aug. 20-24, 2012; Change Request 32.422 CR 021; rev Current version: 11.4.0 (6 pages).

NEC: "Mechanisms for reduction of redundant MDT data", 3GPP Draft; S5-121875 Disc R11; MechanismstoreducredunDantMDTData, 3rd Generation Partnership Project (3GPP), Mobile Competence Centre ; 650, Route Des Lucioles ; F-06921 Sophia-Antipolis Cedex ; Fran, vol. SA WG5, no. Berlin, Germany; 20120820-20120824; Aug. 10, 2012 (Aug. 10, 2012), (2 pages).

NEC: "Add mechanism for reduction of redundant MDT data", 3GPP Draft; S5-121876 CRT032422-B40 Add Mechanism on Reduction of Redundant—MDT Data, 3rd Generation Partnership Project (3GPP), Mobile Competence Centre ; 650, Route Des Lucioles ; F-06921 Sophia-Ant vol. SA WG5, no. Berlin, Germany; 20120820-20120824; Aug. 10, 2012 (Aug. 10, 2012) (6 pages).

NTT Docomo et al: "Location Information in event Ax, Bx measurement report for Immediate MDT", 3GPP Draft; R2-123707 Ax, Bx Events for MDT, 3rd Generation Partnership Project (3GPP), Mobile Competence Centre ; 650, Route Des Lucioles ; F-06921, Sophia-Antipolis Cedex ; France vol. 1. RAN WG2, no. Qingdao, China; 20120813-20120817; Aug. 7, 2012 (Aug. 7, 2012), (4 pages).

Ericsson et al: "Logged MDT measurement reporting", 3GPP Draft; R2-101994 Logged Reporting for MDT, 3rd Generation Partnership Project (3GPP), Mobile Competence Centre ; 650, Route Des Lucioles ; F-06921 Sophia-Antipolis Cedex ; France, vol. RAN WG2, no. Beijing, china; 20100412, Apr. 6, 2010 (Apr. 6, 2010) (2 pages).

Kyocera: "MDT logging stoppage based on battery threshold level", 3GPP Draft; R2-105607, MDTbatterylevel, 3rd Generation Partnershit Project (3GPP), Mobile Competence Centre ; 650, Route Des Lucioles ; F-06921 Sophia-Antipolis Cedex ; France, vol. RAN WG2, no. Xi'An; 20101011; Oct. 5, 2010 (Oct. 5, 2010) (2 pages).

3GPP TS 25.331 V11.2.0; "3rd Generation Partnership Project; Technical Specification Group Radio Access Network; Radio Resource Control (RRC) Protocol specification (Release 11)"; Jun. 2012; 416 pages (Sections 11.2 & 11.3).

3GPP TS 32.422 V10.8.0; "3rd Generation Partnership Project; Technical Specification Group Services and System Aspects; Telecommunication management; Subscriber and equipment trace; Trace control and configuration management (Release 10)"; Jun. 2012; 121 pages.

3GPP TS 36.331 V10.6.0; "3rd Generation Partnership Project; Technical Specification Group Radio Access Network; Evolved Universal Terrestrial Radio Access (E-UTRA); Radio Resource Control (RRC); Protocol specification (Release 10)"; Jun. 2012; 302 pages.

3GPP TS 37.320 V11.0.0; "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); overall description; Stage 2 (release 11)"; Jun. 2012; 20 pages.

\* cited by examiner

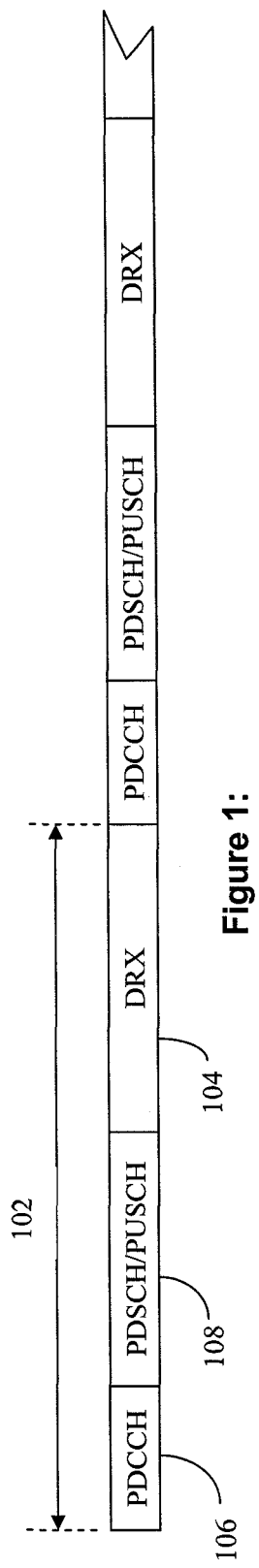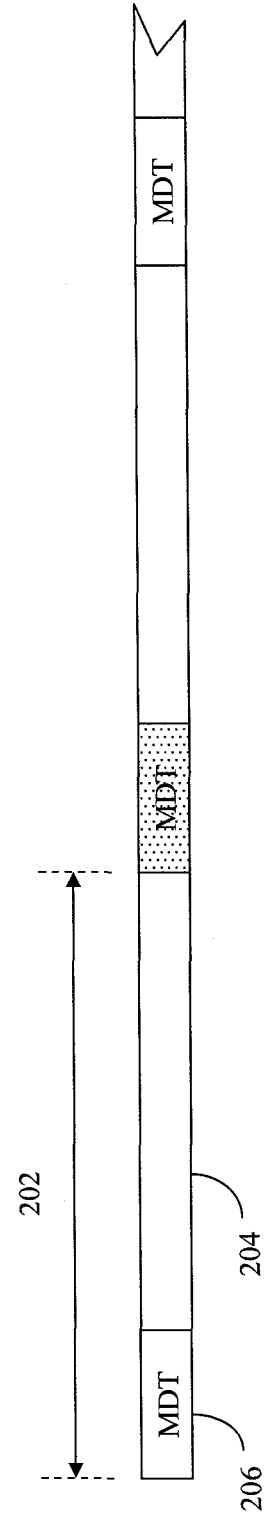
Figure 1:
Prior Art
Figure 2:
Prior Art

MEASUREMENT CONFIGURATION AND REPORTING WITH DIVERSE TRAFFIC

TECHNICAL FIELD

The exemplary and non-limiting embodiments of this invention relate generally to wireless communication systems, methods, devices and computer programs and, more specifically, relate to measurement collecting and reporting in a wireless communication system, sometimes termed minimization of drive tests.

BACKGROUND

Wireless network operators are strongly motivated to use resources in an efficient way, both in order to maximize their own profit and to provide services to customers at a reasonable price. Network optimization, that is, the placement and configuration of resources so as to maximize the area in which coverage is provided and the quality of service provided by that coverage, contributes greatly to the efficient use of resources. One way in which operators carry out network optimization is through drive testing, in which employees of an operator carry a device, such as user equipment (UE) with specialized measurement capabilities, through the service area of a network. The device is usually carried in an automobile, and as the employee drives to various points within the service area, the device collects data relating to the quality of the service that is being made available to it. Drive testing is obviously costly due to equipment and labor expenses, and particularly as the drive tests have to be repeated every time changes are made for the network configuration. Furthermore, the unnecessary use of automobiles contributes to air pollution and also presents some measure of personal danger to the employees performing the testing, because the possibility of traffic accidents is always present.

In order to minimize drive testing, operators are more and more turning to mechanisms that take advantage of the fact that customer devices are constantly receiving service in numerous locations throughout their service areas and that receiving information relating to the service experience of multiple devices can substitute for drive testing in many cases and can reduce or eliminate the need for drive testing. 3GPP release 10 includes a feature called "Minimization of Drive Tests" (MDT), which provides the ability for operators to gather information such as radio measurements which are associated with customer UEs and use this information to assist network optimization.

3GPP release 10 specifications relating to MDT for the LTE and UMTS radio access technologies may be found, for example, in 3GPP TS 32.422, TS 37.320, TS 36.331, and TS 25.331. There are two modes of MDT operation: Immediate MDT and Logged MDT. In Immediate MDT, UE-based information and eNodeB-based information are collected by the eNodeB while the UE is in the connected state and conveyed to a data storage server known as a trace collection entity (TCE). In Logged MDT, the UE stores UE-based information in a log while in the idle state, and the log is collected by the eNodeB and conveyed to a TCE at a later point in time when the UE is in the connected state. Examples of UE-based information are location information such as Global Navigation Satellite System (GNSS) coordinates, or downlink radio measurements such as Reference Signal Received Power (RSRP) or Reference Signal Received Quality (RSRQ). An example of eNodeB-based information is uplink radio measurements such as Received Interference Power measurement.

The basic principles of MDT are expected to remain for 3GPP release 11. However, there is a work item to explore enhancements for Diverse Data Applications (eDDA) with the purpose of addressing potential issues that may arise from the prevalence of smart phones having 'always-on' applications running, such as email, RSS feeds, social network monitoring and the like. These applications require a constant or near constant connection with the network but will typically generate only intermittent traffic, generally small packets in the background without active usage of the terminal applications.

Relatedly, the UE can indicate if it wishes a power optimized configuration by sending a "preference for power optimized configuration" indication to the network. Such an indication informs the network that the UE prefers to be in a reduced power consumption state as compared to some default power consumption state.

There are in general two ways the network deals with the UE's 'always-on' applications. One way is for the network to release the UE's connection shortly after the always-on application's data transfer. This typically results in frequent state transitions between idle and connected states for the UE. If the UE is also configured for logged MDT there will be frequent retrieval of logged MDT data, and so the MDT reports will each have only a small number of samples due to the frequent state transitions which is not very efficient for the network's MDT purposes. The other way is for the network to keep the UE in connected state and configure the UE's discontinuous reception (DRX) to a very long interval, which allows the UE to sleep during the DRX period of the DRX cycle and thus conserve battery power. If the UE is also configured for immediate MDT there can be additional signalling which can negate the intended power savings from the long DRX period.

SUMMARY

According to a first aspect of the invention there is a method comprising: receiving at a network node a preference for a power optimized configuration for a user equipment; and in response to receiving the preference for the user equipment, the network node changing a minimization of drive test (MDT) configuration for the user equipment.

According to a second aspect of the invention there is an apparatus comprising at least one processor and at least one memory storing computer program code. In this aspect the at least one memory with the computer program code is configured with the at least one processor to cause the apparatus to at least: receive a preference for a power optimized configuration for a user equipment; and in response to receiving the preference for the user equipment, changing a minimization of drive test (MDT) configuration for the user equipment.

According to a third aspect of the invention there is a memory storing computer program code comprising code for changing a minimization of drive test (MDT) configuration for a user equipment in response to receiving a preference for a power optimized configuration for the user equipment.

According to a fourth aspect of the invention there is a method comprising: receiving at a user equipment from a network a minimization of drive test (MDT) configuration having a measurement logging or reporting interval, and at least one of a configuration for discontinuous reception (DRX) having a DRX interval and a configuration for paging having a paging interval; and the user equipment adapting the MDT configuration autonomously of the network to conserve battery power in the user equipment.

According to a fifth aspect of the invention there is an apparatus comprising at least one processor and at least one memory storing computer program code. In this aspect the at least one memory with the computer program code is configured with the at least one processor to cause the apparatus to at least: receive from a network a minimization of drive test (MDT) configuration having a MDT measurement reporting or logging interval, and at least one of a configuration for discontinuous reception and a configuration for paging having a DRX/paging interval; and adapt the MDT configuration autonomously of the network to conserve battery power.

According to a sixth aspect of the invention there is a memory storing computer program code comprising: code for receiving from a network a minimization of drive test (MDT) configuration having a measurement reporting or logging interval, and at least one of a configuration for discontinuous reception and a configuration for paging having a DRX/paging interval; and code for adapting the MDT configuration autonomously of the network to conserve battery power.

BRIEF DESCRIPTION OF THE DRAWINGS

FIG. 1 is a schematic timing diagram illustrating active and inactive periods during a discontinuous reception interval for a user equipment according to the prior art.

FIG. 2 is a schematic timing diagram illustrating active and inactive periods during a MDT interval for a user equipment according to the prior art.

DETAILED DESCRIPTION

Figure 3:
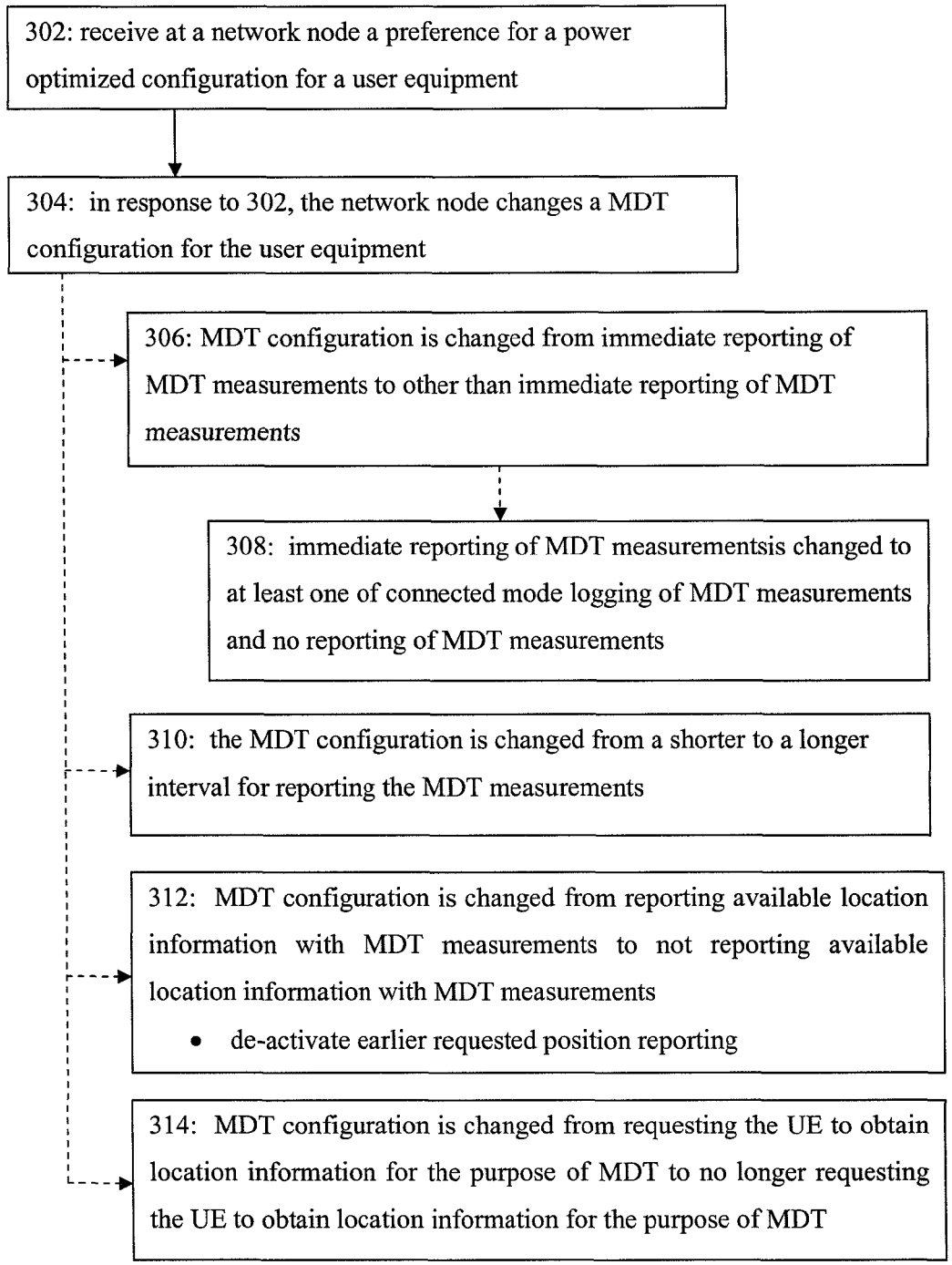
FIG. 3 is a logic flow diagram that illustrates the operation of a method, and a result of execution of computer program instructions embodied on a computer readable memory, in accordance with some exemplary embodiments of this invention.

The inventors have identified several ways to better optimize the MDT operation for power consumption considerations at the user terminal, particularly in view of the eDDA considerations. Specifically, these teachings provide solutions for some issues arising from the usage of the smart phones for MDT measurements while generating diverse type of data traffic over the radio interface.

In current practice MDT does not take advantage of the UE assistance information on power preference that will be available from the Release 11 UEs which indicate a preference for power optimized configurations.

The network has various MDT configuration options and parameter values with which it can configure a UE's MDT measurements and reports, many of which impact UE power consumption differently. For example, Release 11 introduces for MDT that the network can request the UE to obtain location information for the purpose of MDT; this may result in increased UE power consumption if used inappropriately. Since the MDT configuration can have a noticeable impact on the UE's power consumption, it follows that a network which considers UE power consumption when configuring a UE for MDT can tailor its MDT configuration for that UE to account for the MDT's impact to UE battery consumption. The network can use the UE's indication of its preference to conserve battery power when deciding on the MDT configuration for that UE, or even for choosing which UEs the network is to configure for collecting and reporting MDT data.

Still considering impact on UE power consumption and UE power preferences, the network can also have a strategy to keep the smart phones mainly in a connected state and then configure the DRX cycle to reduce the UE power consumption. In LTE the longest DRX cycles currently are 1.28 and 2.56 seconds. This cycle may be longer than the MDT reporting period for the case of immediate MDT. If so, this will result in increased UE power consumption due to the additional signaling between the configured DRX activity times. FIGS. 1-2 illustrate this point.

The DRX concept is well known in the cellular radio arts, and broadly illustrated for the LTE system in FIG. 1. There are DRX periods (inactive periods) 104 during which a mobile terminal/UE is allowed to power down (sleep or idle mode) to conserve power and during which the network refrains from sending transmissions directed to that UE. The active periods 106, 108 are synchronized to the end of this DRX period. The physical downlink control channel (PDCCH) gives resource allocations to multiple mobile terminals during PDCCH active period 106 for resources in the uplink and downlink shared channels, which can then be used by the UE during PDSCH and PUSCH active period 108. More than one consecutive PDCCH may be used ('on-duration'), but the overall schedule repeats after the end of each DRX period 104. If a UE is not scheduled for data on the PDSCH or PUSCH by the corresponding PDCCH, the UE can sleep during that period and effectively begin its DRX period 104 after it sees that it is not allocated any resources by the PDCCH.

The overall DRX cycle length is shown in FIG. 1 as the DRX interval 102. FIG. 1 illustrates for a UE in the connected state; for a UE in the idle state there is a paging interval rather than a DRX interval, and in place of the PDCCH in the active period 106 there is a paging occasion during which the UE tunes to a paging channel to listen whether or not it is being paged. If there is no page the idle state UE then returns to the DRX inactive period (similar to the DRX period 104), and the next paging occasion will be in the next paging interval. The connected state DRX period 104 and/or DRX interval 102 (and similarly the idle state DRX period and/or paging interval) is one of the parameters with which the network configures the connected/idle state terminal, so that the UE and eNodeB will have synchronized occasions for resource allocations/paging occasions defined by the DRX/paging schedule or DRX/paging interval during which the eNodeB can send resource allocations or a page to the UE.

While the examples herein are in the context of the LTE system, this is not a limiting embodiment of these teachings. Many other radio access technologies (RATs) use a DRX interval 102 and/or paging interval to allow the UE to conserve its battery power, though these other RATs may schedule UEs differently than the PDCCH concept in LTE. For example, the GERAN system uses a paging period, legacy UTRAN (3G) uses paging and idle mode DRX and UTRAN HSPA uses a connected mode DRX cycle. Regardless of the terminology for these different RATs, most use some type of repeating DRX interval 102 and/or paging interval which allow the UE the opportunity to enter a low power state.

Similarly, the MDT configuration for a UE has a MDT interval 202 shown at FIG. 2. The UE will take its measurements 206 at the start of the MDT interval 202 and then again at the start of the next MDT interval 202, and between them is a "sleep" time 204 where no MDT actions are required. A UE configured for immediate MDT will report each MDT measurement 206 to the network during its next appropriate transmission opportunity, whereas a UE configured for logged MDT will locally store the results from one or multiple MDT measurements 206 (as the case may be) and report in response to the network's reporting request when the UE is again in a connected state with the network.

When the UE signals its preference for power optimized configuration to the network, the network may in response set the UE's DRX interval 102 to a long period. But in prior implementations of MDT the network does not take this preference into account when configuring the UE with its MDT interval 202. As noted briefly above, the end result for a given UE may be that its configured MDT interval 202 is shorter than its configured DRX interval 102. This means the UE will need to wake up to take a MDT measurement, and also possibly report its MDT measurements if the UE is in the connected state, while still within its DRX period 104. Such a MDT measurement is shown at FIG. 2 by shading, which aligns with the same UE's DRX period 104 at FIG. 1. This is one instance in which conventional practice does not optimize the UE's power consumption. The teachings below consider this issue and several others to better optimize UE power consumption.

According to embodiments of these teachings, the network can use the UE's indication of its "preference for power optimized configuration" as the trigger for changing the UE's MDT configuration according to any one or more of the following:

Stopping/un-configuring a UE configured for immediate MDT that is currently performing immediate MDT;

Stopping "requested location" and/or increasing periodicity of UE-based measurements for the UE that is currently performing immediate MDT; and Changing the MDT configuration from immediate MDT to connected-mode Logging.

The first two above may be considered as specific implementations of the more general principle of reducing the battery impact of any UE-based measurements by adapting the UE's immediate MDT configuration, whereas the third may be considered as one specific implementation of the more general principle of adapting configuration of an MDT connected-state mode to one that has less of a battery impact than the conventional immediate MDT (i.e., immediate measuring and reporting of MDT).

In other embodiments of these teachings the UE's indication of its "preference for power optimized configuration" can also be used by the network as:

An input to its algorithm/procedure for selecting UEs to perform MDT, and/or when determining the immediate MDT configuration for a selected UE.

A parameter for optimizing the network's retrieval from the UE of logged MDT measurements (e.g. the network can defer sending to the UE its request for MDT measurement results until radio conditions are strong or until the UE is no longer in a "reduced power consumption" state).

FIG. 3 is a logic flow diagram that illustrates the operation of a method, and a result of execution of computer program instructions, in accordance with the exemplary embodiments of this invention from the perspective of the network access node, though such method may be executed by one or more components of such a access node rather than the entire base station/access node itself. Dashed lines indicate optional elements. In accordance with these exemplary embodiments a network node receives at block 302 a preference for a power optimized configuration for a user equipment. In response at block 304 the network node changes a minimization of drive test (MDT) configuration for the user equipment.

Further portions of FIG. 3 summarize some of the various non-limiting implementations for block 304 that are detailed more particularly above. At block 306 the MDT configuration is changed from immediate reporting of MDT measurements to other than immediate reporting of MDT measurements. One example of this is at block 308 where the MDT configuration is changed from immediate reporting of MDT measurements to one of connected mode logging of MDT measurements and no reporting of MDT measurements. In one of the implementations of the invention, a power preference indication can be considered as implicit indication of autonomous removal or modification of MDT configuration by the UE. For example, the network access node may assume that the MDT measurements and reporting are automatically stopped when the power preference indication is received from the UE.

In other examples of how the drive test configuration is changed, at block 310 it is changed from a shorter to a longer interval for reporting the MDT measurements; at block 312 it is changed from reporting available location information with MDT measurements to not reporting available location information with MDT measurements (such as for example de-activating the UE from including in its MDT reports the UE's position); and at block 314 it is changed from requesting the user equipment to obtain location information for the purpose of MDT to no longer requesting the user equipment to obtain location information for the purpose of MDT.

In other embodiments of these teachings below and summarized at FIG. 4, the UE can act autonomously of the network to reduce its power consumption. In this case the UE may still signal the network with its preference for power optimized configuration, and from that the network can know that the UE may be taking one or more of the following autonomous actions to reduce its power consumption since in these teachings it is understood in advance which actions the UE is allowed to take autonomously (that is, without a formal MDT reconfiguration by the network).

Figure 4:
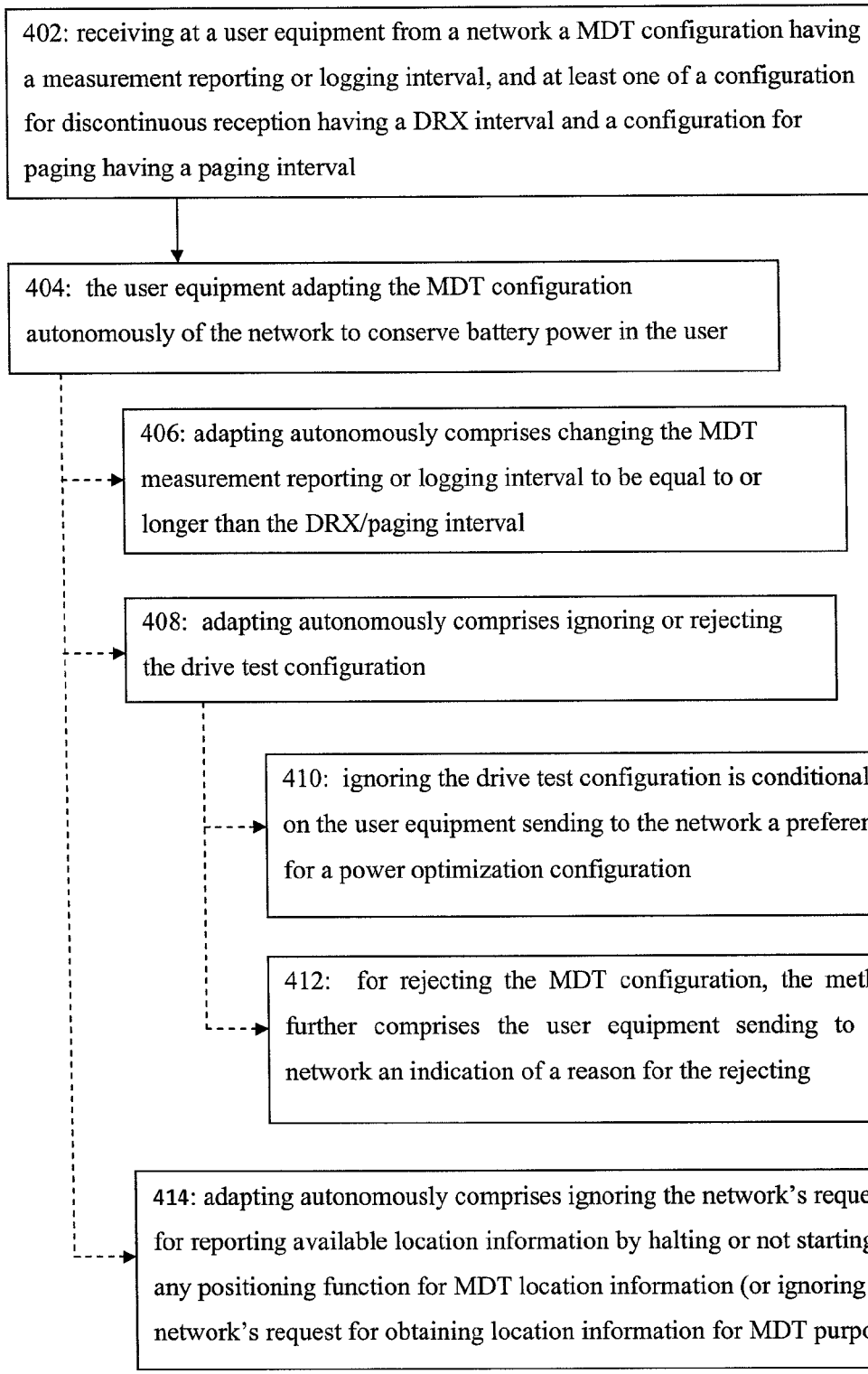
FIG. 4 is a logic flow diagram that illustrates the operation of a method, and a result of execution of computer program instructions embodied on a computer readable memory, in accordance with other exemplary embodiments of this invention.

FIG. 4 is a logic flow diagram that illustrates the operation of a method, and a result of execution of computer program instructions, in accordance with the exemplary embodiments of this invention from the perspective of the UE 10, though such method may be executed by one or more components of such a UE 10 rather than the entire UE itself. Dashed lines indicate optional elements. In accordance with these exemplary embodiments at block 402 the user equipment receives from a network a minimization of drive test (MDT) configuration having a measurement reporting or logging interval, and at least one of a configuration for discontinuous reception (DRX) having a DRX interval and a configuration for paging having a paging interval. Then at block 404 the user equipment adapts the MDT configuration autonomously of the network to conserve battery power in the user equipment.

Further portions of FIG. 4 summarize some of the various non-limiting implementations for block 404 that are detailed more particularly above. If the DRX interval (or the paging interval) is longer than the configured MDT measurement reporting or logging interval as is shown by example at FIGS. 1-2, other embodiments of these teachings summarized at block 406 allow the UE to autonomously adapt the MDT measurement reporting/logging interval 202 to be at minimum the length of the DRX interval 102 for the case the UE is in a connected state, or at minimum the length of the paging interval for the case the UE is in the idle state. The UE's power consumption can be reduced by allowing the same sleep/inactivity times (104 in FIG. 1, 204 in FIG. 2) for the UE in between the active times (106 and 108 in FIG. 1, 206 in FIG. 2). While the UE can autonomously make this decision, its change of the MDT measurement reporting or logging interval 202 will be eventually visible to the network in the reporting time instants, or in the reported data where the UE is configured for logged MDT (since the reporting of logged MDT measurements will have time stamps in the reported MDT logs). Neither of these implementations will cause difficulties respecting the network's analysis of the reported data because of the reporting time instant for the case of immediate MDT and the time stamp for the case of logged MDT.

In another embodiment of the autonomous UE power saving actions summarized at block 408, the UE is allowed to ignore or reject the MDT configuration that it receives from the network when the UE is in the "preference for power optimized configuration" state, regardless of whether the MDT configuration is immediate MDT, logged MDT, or some new MDT configuration which may be developed in the future. Similarly, a UE in the "preference for power optimized configuration" state can ignore or reject a new or changed MDT configuration that it receives from the network. In any of these cases, these autonomous UE actions may or may not be conditional on the UE first sending to the network its "preference for power optimized configuration" indication as shown at block 410. In an embodiment the UE need not send this indication in advance of ignoring or rejecting a MDT configuration, but instead when the UE rejects the network's new MDT configuration it may send an indication of its rejection reason to the network as shown at block 412, so the network is at least informed the UE will not be complying with the network's MDT configuration.

In yet another embodiment of the autonomous UE power saving actions summarized at block 414, the UE is allowed to ignore the network's request for reporting available location information or for obtaining location information for the purpose of MDT by halting or not starting any positioning function for MDT location information, or otherwise rejecting the requested location without any attempt to activate that positioning function at the UE.

Figure 5:
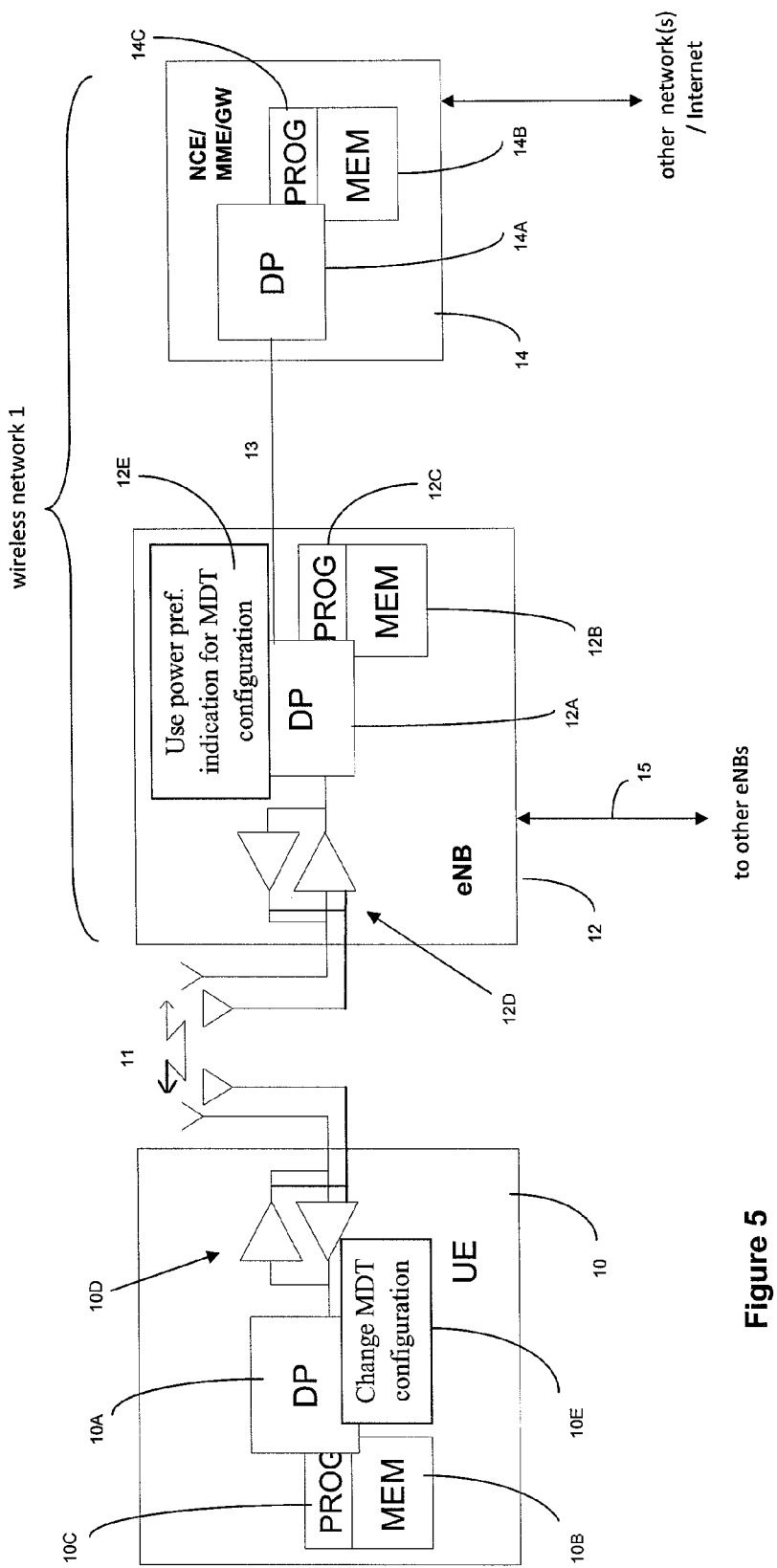
FIG. 5 shows a simplified block diagram of certain apparatus according to various exemplary embodiments of the invention.

Reference is now made to FIG. 5 for illustrating a simplified block diagram of various electronic devices and apparatus that are suitable for use in practicing the exemplary embodiments of this invention. In FIG. 5 a wireless network 1 is adapted for communication over a wireless link 11 with an apparatus, such as a mobile communication device which above is referred to as a UE 10, via a network access node, such as a base station or relay station or remote radio head, and more specifically shown as an eNodeB 12. The network 1 may include a network control element (NCE) 14 that serves as a mobility management entity MME and/or a serving gateway S-GW to a broader network such as a publicly switched telephone/data network and/or the Internet.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNodeB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNodeB 12 is coupled via a data/control path 13 to the NCE 14. The path 13 may be implemented as the S1 interface in the case the network 1 is an LTE network. The eNodeB 12 may also be coupled to another eNodeB via data/control path 15, which may be implemented as the X2 interface in the case the network 1 is an LTE network.

At least one of the PROGs 10C and 12C is assumed to include program instructions that, when executed by the associated DP, enable the device to operate in accordance with the exemplary embodiments of this invention as was detailed by non-limiting example above with respect to FIGS. 3 and 4. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a program or algorithm 10E for implementing how it may change the MDT configuration that is provided to it by the network 1, where that change is implemented at the UE autonomous of the network. Similarly the eNodeB 12 may also include its own algorithm or program 12E for taking into account the power configuration preference indicated by the UE when configuring the UE for MDT.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Note that the various DPs 10A, 12A may be implemented as one or more processors/chips, either or both of the UE 10 and the eNodeB 12 may include more than one transmitter and/or receiver 10D, 12D, and particularly the eNodeB 12 may have its antennas mounted remotely from the other components of the eNodeB 12, such as for example tower-mounted antennas.

Specific apparatus for performing the steps at FIGS. 3-4 may include sending and receiving means for sending and receiving the configurations at block 302 and 402, and controlling means for making the decisions at blocks 304 and 404. In a particular embodiment the receiving means may be embodied in at least a receiver 10D/12D and the controlling means may be embodied in at least a processor 10A/12A, both of which are illustrated at FIG. 5. Another specific apparatus may include at least one processor 10A/12A and at least one memory 10B/12B including computer program code 10C/10E/12C/12E, in which the memory and the computer program code are configured with the at least one processor to cause the apparatus at least to perform the steps shown at FIGS. 3-4.

The various blocks shown in FIGS. 3-4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 3GPP LTE system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

We claim:

1. A method comprising:
   receiving at a network node a preference for a power optimized configuration for a user equipment, wherein the preference reflects a determination by the user equipment made independently of minimization of drive test (MDT) configuration considerations; and
   in response to receiving the preference for the user equipment, changing, by the network node, a minimization of drive test (MDT) configuration for the user equipment.

2. The method according to claim 1, wherein the MDT configuration is changed from immediate reporting of MDT measurements to other than immediate reporting of MDT measurements.

3. The method according to claim 2, wherein the MDT configuration is changed from immediate reporting of MDT measurements to one of connected mode logging of MDT measurements and no reporting of MDT measurements.

4. The method according to claim 1, wherein the MDT configuration is changed from a shorter to a longer interval for reporting MDT measurements.

5. The method according to claim 1, wherein the MDT configuration is changed from reporting available location information to not reporting available location information.

6. The method according to claim 1, where the MDT configuration is changed from requesting the user equipment to obtain location information for the purpose of MDT, to no longer requesting the user equipment to obtain location information for the purpose of MDT.

7. The method according to claim 1, wherein the method is performed by the network node which is a Radio Access Network node.

8. An apparatus comprising:
   at least one processor; and
   at least one memory storing computer program code;
   in which the at least one memory with the computer program code is configured with the at least one processor to cause the apparatus to at least:
   receive a preference for a power optimized configuration for a user equipment, wherein the preference reflects a determination by the user equipment made independently of minimization of drive test (MDT) configuration considerations; and
   in response to receiving the preference for the user equipment, changing a minimization of drive test (MDT) configuration for the user equipment.

9. The apparatus according to claim 8, wherein the MDT configuration is changed from immediate reporting of MDT measurements to other than immediate reporting of MDT measurements.

10. The apparatus according to claim 9, wherein the MDT configuration is changed from immediate reporting of MDT measurements to one of connected mode logging of MDT measurements and no reporting of MDT measurements.

11. The apparatus according to claim 8, wherein the MDT configuration is changed from a shorter to a longer interval for reporting MDT measurements.

12. The apparatus according to claim 8, wherein the MDT configuration is changed from reporting available location information to not reporting available location information.

13. The apparatus according to claim 8, where the MDT configuration is changed from requesting the user equipment to obtain location information for the purpose of MDT, to no longer requesting the user equipment to obtain location information for the purpose of MDT.

14. A computer readable medium storing a program of instructions, execution of which by at least one processor configures an apparatus to perform at least:
   receiving at a network node a preference for a power optimized configuration for a user equipment, wherein the preference reflects a determination by the user equipment made independently of minimization of drive test (MDT) configuration considerations;

changing a minimization of drive test (MDT) configuration for a user equipment in response to receiving the preference for a power optimized configuration for the user equipment.

15. A method comprising:
receiving at a user equipment from a network a minimization of drive test (MDT) configuration having an MDT measurement reporting or logging interval, and at least one of a configuration for discontinuous reception (DRX) having a DRX interval and a configuration for paging having a paging interval; and
by the user equipment, adapting the MDT configuration autonomously of the network to conserve battery power in the user equipment, wherein adapting the MDT configuration autonomously of the network comprises adapting a location information configuration.

16. The method according to claim 15, wherein adapting the MDT configuration autonomously of the network comprises changing the MDT measurement reporting or logging interval to be equal to or longer than the DRX interval or the paging interval.

17. The method according to claim 15, wherein adapting the MDT configuration autonomously of the network comprises ignoring or rejecting the MDT configuration.

18. The method according to claim 17, wherein ignoring the MDT configuration autonomously of the network is conditional on the user equipment sending to the network a preference for a power optimized configuration.

19. The method according to claim 17, wherein for rejecting the MDT configuration, the method further comprises the user equipment sending to the network an indication of a reason for the rejecting.

20. The method according to claim 17, wherein the MDT configuration that is received from the network requests that location information for the user equipment be included with MDT measurement reports, and ignoring or rejecting the MDT configuration comprises the user equipment halting a positioning function which provides the location information for the MDT measurement reports.

21. An apparatus comprising:
at least one processor; and
at least one memory storing computer program code;
in which the at least one memory with the computer program code is configured with the at least one processor to cause the apparatus to at least:
receive from a network a minimization of drive test (MDT) configuration having an MDT measurement reporting or logging interval, and at least one of a configuration for discontinuous reception (DRX) having a DRX interval and a configuration for paging having a paging interval; and
adapt the MDT configuration autonomously of the network to conserve battery power, wherein adapting the MDT configuration autonomously of the network comprises adapting a location information configuration.

22. The apparatus according to claim 21, wherein adapting the MDT configuration autonomously of the network comprises changing the MDT measurement reporting or logging interval to be equal to or longer than the DRX interval or the paging interval.

23. The apparatus according to claim 21, wherein adapting the MDT configuration autonomously of the network comprises ignoring or rejecting the MDT configuration.

24. The apparatus according to claim 23, wherein ignoring the MDT configuration autonomously of the network is conditional on the user equipment sending to the network a preference for a power optimized configuration.

25. The apparatus according to claim 21, wherein for rejecting the MDT configuration, the at least one memory with the computer program code is configured with the at least one processor to cause the apparatus to send to the network an indication of a reason for the rejecting.

26. The apparatus according to claim 23, wherein the MDT configuration that is received from the network requests that location information for the user equipment be included with MDT measurement reports, and ignoring or rejecting the MDT configuration comprises the user equipment halting a positioning function which provides the location information for the MDT measurement reports.

27. A computer readable medium storing a program of instructions, execution of which by at least one processor configures an apparatus to perform at least:
receiving from a network a minimization of drive test (MDT) configuration having an MDT measurement reporting or logging interval, and at least one of a configuration for discontinuous reception (DRX) having a DRX interval and a configuration for paging having a paging interval; and
adapting the MDT configuration autonomously of the network to conserve battery power, wherein adapting the MDT configuration autonomously of the network comprises adapting a location information configuration.

* * * * *

UNITED STATES PATENT AND TRADEMARK OFFICE
CERTIFICATE OF CORRECTION

PATENT NO. : 9,591,501 B2
APPLICATION NO. : 13/630670
DATED : March 7, 2017
INVENTOR(S) : Tomala et al.

Page 1 of 1

It is certified that error appears in the above-identified patent and that said Letters Patent is hereby corrected as shown below:

Claim 14, Column 10, Line 67 --and-- should be inserted after "considerations;".

Signed and Sealed this
Second Day of May, 2017

Michelle K. Lee
*Director of the United States Patent and Trademark Office*